United States Patent [19]

Nieuwendijk et al.

[11] Patent Number: 5,471,018

[45] Date of Patent: Nov. 28, 1995

[54] AUDIO OR VIDEO APPARATUS WITH A BUILT-IN LOUDSPEAKER

[75] Inventors: Joris A. M. Nieuwendijk; Johannes W. T. Bax, both of Eindhoven, Netherlands; Cornelis J. Oepkes, Singapore, Singapore; Henricus H. Roelofs; Martinus P. M. Van Den Thillart, both of Eindhoven, Netherlands

[73] Assignee: U.S. Philips Corporation, New York, N.Y.

[21] Appl. No.: 662,045

[22] Filed: Feb. 28, 1991

[30] Foreign Application Priority Data

Mar. 13, 1990 [NL] Netherlands ............... 9000570

[51] Int. Cl.⁶ ................................ H05K 5/00
[52] U.S. Cl. ............................ 181/152; 181/154
[58] Field of Search ..................... 181/152, 154

[56] References Cited

U.S. PATENT DOCUMENTS

| | | | |
|---|---|---|---|
| 2,440,078 | 4/1948 | Devine | 181/145 |
| 2,642,948 | 6/1953 | Olson et al. | 181/145 |
| 4,199,657 | 4/1980 | Lane | 181/145 |

FOREIGN PATENT DOCUMENTS

| | | |
|---|---|---|
| 0353092 | 1/1990 | France . |
| 0735402 | 8/1955 | United Kingdom . |

*Primary Examiner*—Michael L. Gellner
*Assistant Examiner*—Eddie C. Lee
*Attorney, Agent, or Firm*—Bernard Franzblau

[57] ABSTRACT

An audio or video apparatus has a housing, a loud-speaker and an acoustic channel. The loud-speaker acoustically cooperates with the channel. One end of the channel opens into an aperture in a side of the apparatus. The dimensions of the loud-speaker and acoustic channel and the positioning thereof within the housing are chosen so as to provide an apparatus that is compact and at the same time produces improved audio reproduction.

15 Claims, 3 Drawing Sheets

AUDIO OR VIDEO APPARATUS WITH A BUILT-IN LOUDSPEAKER

BACKGROUND OF THE INVENTION

This invention relates to an audio or video apparatus comprising a housing and a loud-speaker incorporated in the housing, in which the housing accommodates an acoustic channel opening at one end into an aperture in a side of the housing, the loud-speaker acoustically cooperates with the channel and the diaphragm of the loud-speaker forms a part of the wall of the acoustic channel, and the acoustic channel has a perpendicular cross-section which continuously augments viewed in the direction of the aperture in said side.

An apparatus of this kind is known from British Patent Specification No. 735,402. An application of the invention to a television set is discussed in that Specification. However, an application in a radio, for example, a car radio could also be considered in this respect. The car radio housing generally comprises all of the electronics required for this application. Said side is the front side of the car radio which is visible and remains accessible if the car radio has been installed in the appropriate aperture in the facia board of the motor car.

In all cases endeavours are made to arrange the components in the housing in a most compact manner so that the apparatus may be kept as small as possible and endeavours are also made to provide the best possible acoustic reproduction.

SUMMARY OF THE INVENTION

It is an object of the invention to provide an audio or a video apparatus which is most compact, provides a good audio reproduction and, in addition, is highly cost-effective. Thereto, the audio or video apparatus according to the invention is characterised in that the length of the loud-speaker viewed in the longitudinal direction of the acoustic channel is greater than or equal to half the length of the acoustic channel, and in that the loud-speaker is arranged in the channel and the channel is formed in a manner such that for a part of the loud-speaker diaphragm, the size of said diagram part being greater than or equal to half the surface area of the diaphragm, it holds that lines perpendicular to this part of the diaphragm surface, once they have been reflected by the channel surface one time, are not directed at said aperture, said lines forming equal angles of incidence and reflection to the channel surface.

The invention is based on the concept that it is possible to incorporate relatively large loud-speakers in audio or video apparatus while the housing of the apparatus can still remain compact. This is particularly achieved when allowing the diaphragm of the loud-speaker to constitute a large part of the wall of the acoustic channel.

This measure is known per se, compare for this purpose U.S. Pat. No. 2,440,078. However, in that patent the loud-speaker is arranged in the channel at such an angle and the channel is formed in a manner such that lines perpendicular to the surface of the diaphragm are directed at said aperture once they have been reflected by the channel surface one time. Thus, the acoustic channel is used inefficiently from an acoustic point of view.

By installing the loud-speaker in such a way and choosing the form of the channel so that these lines are not directed at said aperture after one reflection, optimum use is made of the horn-like effect of the acoustic channel. Consequently, an improved audio reproduction is realised. In addition, standard cone loud-speakers can be used for the whole frequency range.

For example, it is now possible to install a reasonably large loud-speaker in a car radio. According to the DIN standard, the dimensions of car radios are standardized at 50 mm height, 180 mm width and 149 mm depth. The front side of the car radio does not have an aperture for accommodating a reasonably large loud-speaker, which loud-speaker is able to reproduce low-frequency signals having a sufficient level. As a result of the increasing miniaturization of car radio electronics, a cavity for accommodating a reasonably large loud-speaker is developed inside the housing. This may be realised by arranging the loud-speaker in a horizontal (or tilted) fashion in the housing. Through the acoustic channel and the aperture in the front side, the acoustic signals generated by the loud-speaker can reach the passenger compartment of the motor car. In addition, since a car radio can be installed in a facia, this facia can function as an acoustic baffle so that the low-frequency reproduction is favourable.

In the case of a car radio in a lower price region which is, for example, able to reproduce only a mono signal, a single wideband loud-speaker installed in the housing will then be sufficient. This implies that no additional wiring is needed in the motor car itself for connecting one or more loud-speakers/loud-speaker enclosures.

For stereo signal reproduction the loud-speaker installed in the housing could be a woofer. But in that case the car radio should be provided with terminals for supplying relevant electrical signals to at least two squawkers which are then installed elsewhere in the motor car compartment in a stereo arrangement.

The acoustic channel preferably has the form of an acoustic horn. This achieves a proper transmission between the mechanical vibrations of the loud-speaker diaphragm and the acoustic signal supplied by the car radio, more specifically, if higher frequency audio signals also are reproduced through the loud-speaker.

The car radio may further be characterised in that the loud-speaker is arranged to reproduce a low-frequency audio signal, in that the car radio further includes second and third loud-speakers arranged to reproduce a higher frequency portion of a respective left or right signal portion of a stereo signal, and in that the second and third loud-speakers are mechanically coupled to said side of the housing. In this manner a stereo car radio and hence stereo reproduction may be provided without the need for installing elsewhere in the motor car compartment loud-speakers for reproducing the respective left or right information of the stereo signal and without the need for installing separate wiring in the motor car compartment.

More specifically, if the second and third loud-speakers are coupled each to said side of the housing by means of a support, while being adjustable with respect to the housing, an acceptable stereo reproduction is feasible with a car radio of this kind.

BRIEF DESCRIPTION OF THE DRAWINGS

The invention will be further explained in the following description of the drawings with reference to a number of exemplary embodiments, in which.

DESCRIPTION OF THE PREFERRED EMBODIMENT

Figure 1:
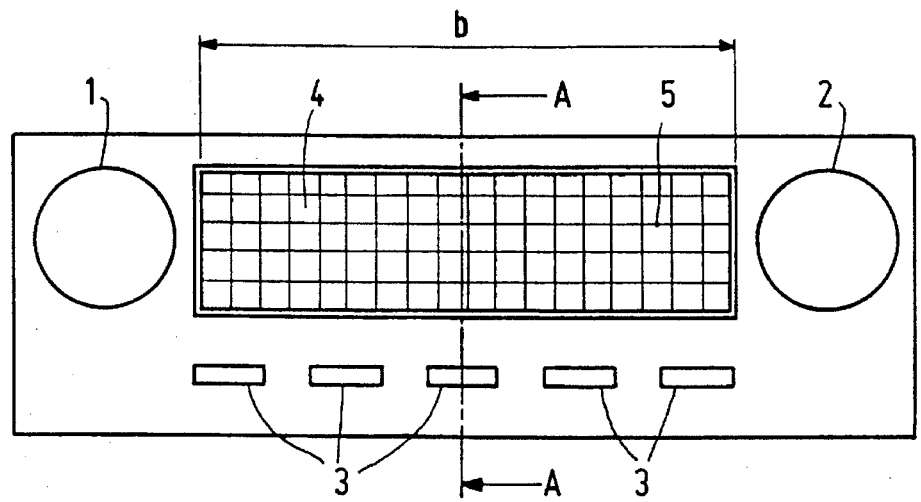
FIG. 1 shows a front elevation of an audio apparatus according to the invention in the form of a car radio.

FIG. 1 shows a front elevation of the car radio according to the invention. The front side comprises a plurality of controls. In this respect one may find a volume control knob 1, a knob 2 for station tuning and push buttons 3, for example, for selecting the frequency range such as FM, MW, LW or USW. The front side of the car radio further has an aperture 4 located, for example, behind a grille 5. However, the grille 5 is not necessary. The aperture 4 has a rectangular shape and a width-to-height ratio of, for example, 3:1.

Figure 2:
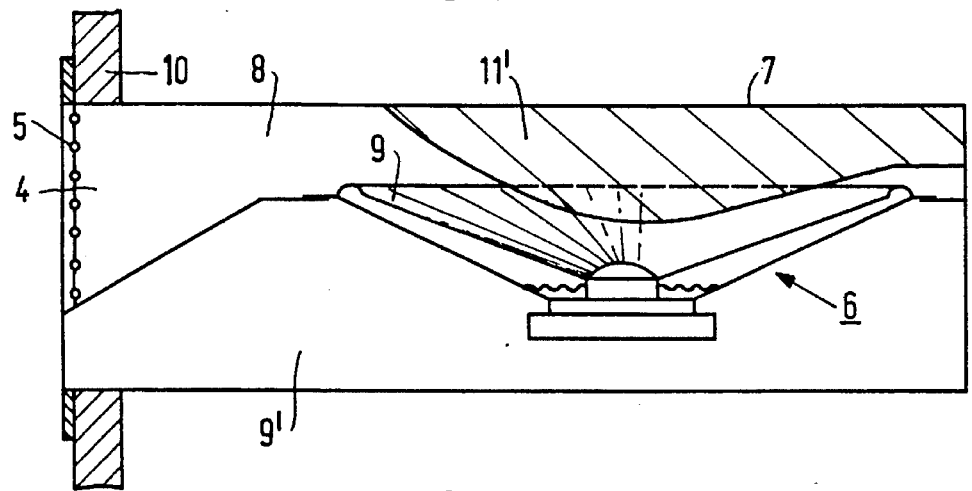
FIG. 2 shows a cross-sectional view of a first car radio.

If the width of the aperture 4 corresponds approximately to the diameter of the loud-speaker 6 incorporated in the car radio, cf. FIG. 2, it may be assumed that the height of the aperture 4 is about equal to ⅓ of the diameter of the loud-speaker 6. The height of the aperture 4, however, may also be taken smaller, which is to say, smaller than ⅓ of the diameter of the loud-speaker 6.

FIG. 2 shows a cross-sectional view of the car radio along the line A—A in FIG. 1, when installed in a facia or dashboard 10 of a motor car. FIG. 2 shows a loud-speaker 6 accommodated in the housing 7 of the car radio. The loud-speaker is a cone loud-speaker of the electrodynamic type. These loud-speakers are known per se and need no further explanation. The loud-speaker 6 acoustically cooperates with a channel 8 which is also accommodated in the housing of the car radio. One end of the channel opens into the aperture 4 at the front side of the car radio. Mechanical vibrations of the diaphragm 9 of the converter 6 are converted into acoustic waves reaching the motor car compartment through the channel 8 and the aperture 4. The loud-speaker 6 is installed in the wall of the acoustic channel 8. The width of the channel 8 may be the same over the entire length of the channel and then, for example, be equal to the width 6 of the aperture 4 in the front side of the car radio.

The housing includes a shaping portion 11' to give the channel a cross-section which continuously augments viewed in the direction of the aperture 4. Viewed in this longitudinal direction of the channel 8 the loud-speaker 6 has a dimension which is larger than or equal to half the length of the channel 8. Preferably, the size of the surface of the diaphragm is at least a quarter of the surface of the channel 8.

The channel 8 and the cavity 9' in the housing behind the loud-speaker 6 are acoustically separated to avoid acoustic short circuiting. In the wall of the housing behind the loud-speaker there are preferably apertures so that the low-frequency tone reproduction of the loud-speaker is not impeded by the cavity 9'. The cavity 9' contains the car radio electronics.

Figure 3:
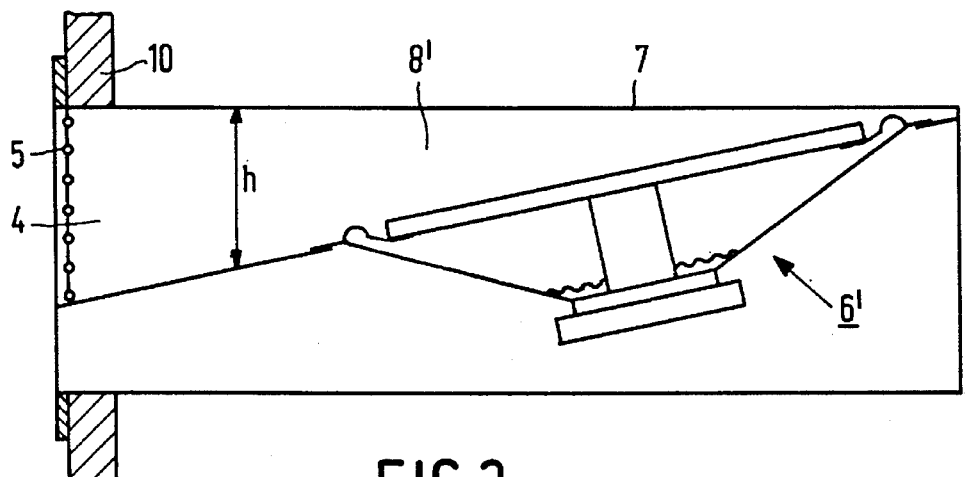
FIG. 3 shows a cross-sectional view of a second car radio.

In order to insure that the acoustic channel does not unfavourably affect the transmission of the acoustic signal from the loud-speaker to the motor car compartment, the channel is preferably arranged to have a cross-section which augments, viewed in the direction of the aperture 4. This could be realised by allowing the width and/or height of the channel 8 towards the aperture 4 to augment ever more. This is shown in FIG. 3 which likewise depicts a cross-sectional view along line A–A' of FIG. 1. In this respect it is assumed that the width of the channel 8 is constant and the height h augments.

The loud-speaker 6' is now a planar diaphragm loud-speaker also of the electrodynamic type, which is installed in the housing 7 in a slightly tilted fashion with respect to the arrangement of FIG. 1.

Planar diaphragm loud-speakers are also known per se and need no further explanation either. The loud-speaker 6' is accommodated in the wall of the channel 8'.

Figure 4:
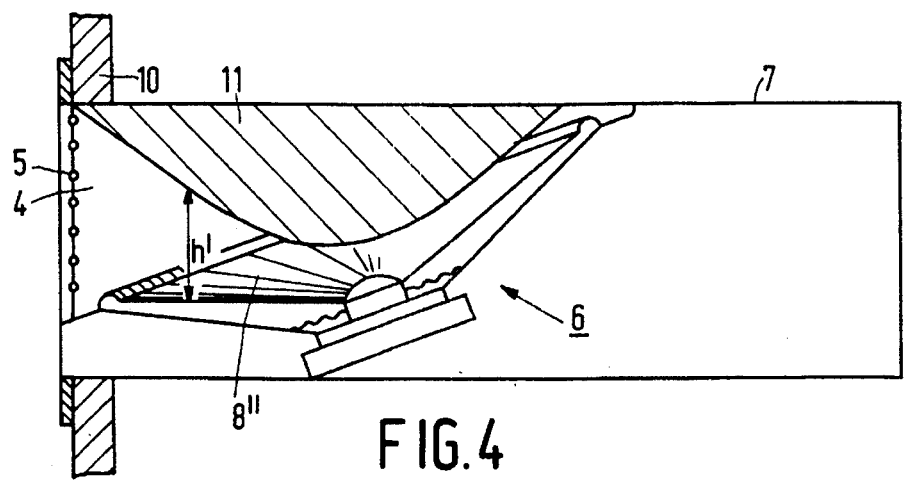
FIG. 4 shows a cross-sectional view of a third car radio.

FIG. 4 shows yet another cross-sectional view. The loud-speaker 6 is installed a little more to the front of the car radio. However, this is not essential. The channel 8" here has a conventional flared horn shape. The width of the channel 8" is again taken as a constant value, for example, equal to b, cf. FIG. 1. The height h' again becomes larger viewed in the direction of the aperture 4, so that the channel 8" in the plane of the drawing has the shape of a flared horn. This is realised by introducing a moulding 11 of the desired shape against the top of the housing 7.

Also in the exemplary embodiment of FIG. 2 a more or less horn-shaped channel could have been realised by introducing a moulding 11' into the channel 8 against the top side of the housing 7 exactly above the converter 6.

Figure 5:
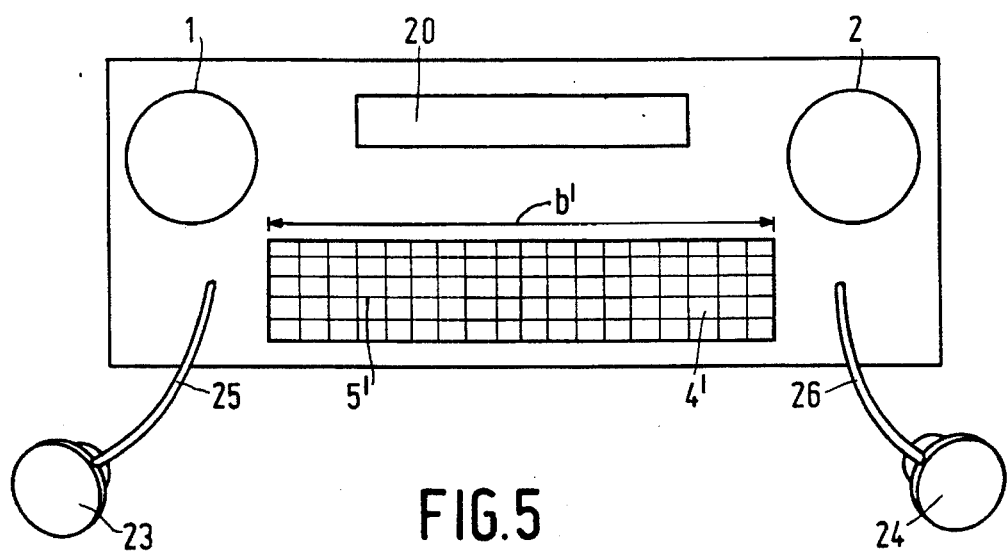
FIG. 5 shows a front elevation of a further car radio.

FIG. 5 shows yet another exemplary embodiment.

The loud-speaker is not shown in FIG. 5, but radiates downwardly into an acoustic channel which opens into the aperture 4. In FIG. 5 an aperture 20 for inserting cassette tapes is indicated. The end 4', of the channel 8''' is again closed by means of a grille 5'. The loud-speaker (not shown) is in this case, for example, a woofer which only reproduces a low-frequency audio signal. One could consider an audio signal composed of the sum of the left and right signal portions of a stereo signal situated in a frequency range of up to about 300 Hz. For stereo signal reproduction the car radio further includes second and third loud-speakers 23, 24 respectively. The loud-speaker 23 is intended to reproduce the left signal portion of the stereo signal. The loud-speaker 23 is a tweeter or a squawker. The loud-speaker 24 is also a tweeter or a squawker and is intended to reproduce the right signal portion of the stereo signal. The loud-speakers 23 and 24 are mechanically coupled to the front side of the car radio. The mechanical coupling may be detachable if need be. FIG. 5 shows that the two loud-speakers are coupled to the front side of the car radio by means of supports 25 and 26 respectively. The loud-speakers are adjustable with respect to the car radio. This may denote that by means of a coupling the loud-speakers are pivotably coupled with respect to and with the supports 25 and 26 and/or that the supports, by means of a coupling, are pivotably coupled with respect to and with the front side of the car radio. Consequently, the loud-speakers may be positioned in a direction so that they provide maximum stereo reproduction for the passenger(s) in the motor car compartment. The electric supply wires to the loud-speakers 23 and 24 may be led through the supports 25 and 26.

An advantage of a car radio of this kind is that no external wiring to the loud-speakers elsewhere in the motor car compartment is necessary and furthermore, the installation is very simple. The car radio together with the loud-speakers may be inserted at one time in the appropriate aperture in the facia and is then ready for use. It will be self evident that the loud-speakers 23 and 24, in view of safety aspects, must not have sharply protruding parts. The facia operates as a baffle for the acoustic signals emanating from the loud-speaker 6.

Figure 6:
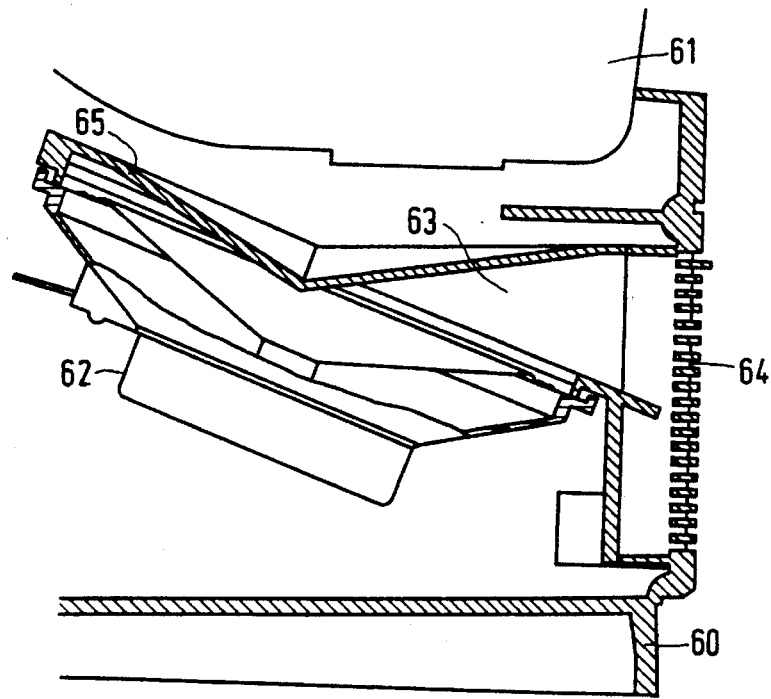
FIG. 6 shows the invention in a television set, and FIG. 7, in FIGS. 7a and 7b, shows an elevation and a cross-sectional view respectively, of the shaping portion in the embodiment shown in FIG. 6.

FIG. 6 shows an application of the invention to a television set. FIG. 6 shows a cross-sectional view of the loud-speaker and acoustic channel, showing only a part of the housing 60 of the television set and the picture tube 61. The loud-speaker 62 has a diameter which is about as large as the length of channel 63. Before the sound exit of the channel 63 a grille 64 is installed. The channel 63 is in this case formed by the loud-speaker itself and a shaping portion 65 shown in greater detail in FIG. 7.

Figure 7A:
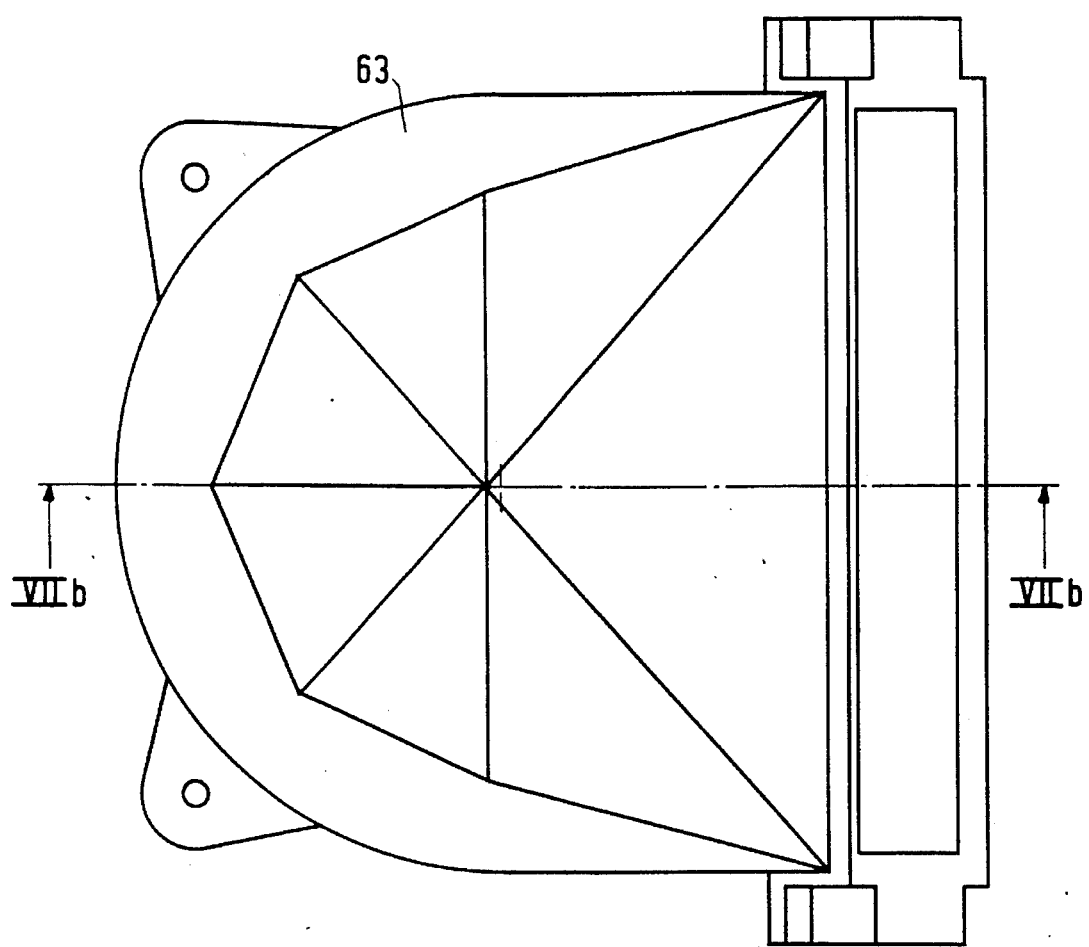
Figure 7B:
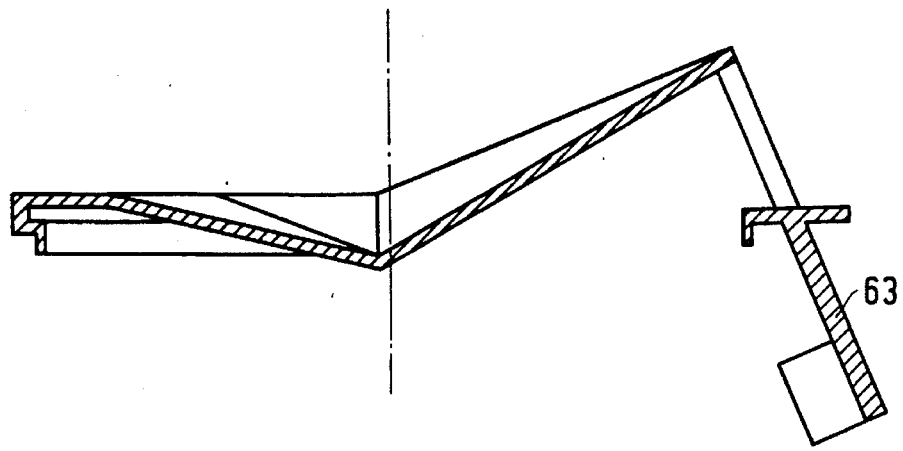

FIG. 7b shows a cross-sectional view of the shaping portion along the line b—b in FIG. 7a, while FIG. 7a shows a plan view of the shaping portion.

We claim:

1. Audio or video apparatus comprising: a housing, a cone loud-speaker incorporated in the housing, wherein the housing accommodates an acoustic channel having one end opening into an aperture in a side of the housing, wherein the loud-speaker acoustically cooperates with the channel and a diaphragm of the loud-speaker forms a part of a wall of the acoustic channel, and the acoustic channel has a perpendicular cross-section which continuously increases viewed in the direction of the aperture in said side, characterized in that the length of the loud-speaker viewed in the longitudinal direction of the acoustic channel is greater than or equal to half the length of the acoustic channel, and in that the loud-speaker is arranged in the channel and the channel is shaped in a manner such that for a part of the loud-speaker diaphragm, the size of said part being greater than or equal to half the surface of the diaphragm, lines perpendicular to said part of the diaphragm surface, once they have been reflected by the channel surface one time, are not directed at said aperture, said lines forming equal angles of incidence and reflection to the channel surface, and wherein the part of the channel wall opposite the loud-speaker has a form which is accommodated to the form of the loud-speaker cone.

2. Audio or video apparatus as claimed in claim 1, wherein the diaphragm surface comprises at least a quarter of the surface of the acoustic channel.

3. Audio or video apparatus as claimed in claim 2, wherein the channel comprises a moulding.

4. Audio or video apparatus as claimed in claim 2, wherein the acoustic channel has the shape of an acoustic horn in which the wide end of the horn comprises said one end of the acoustic channel opening into said aperture.

5. Audio or video apparatus as claimed in claim 1 wherein the loud-speaker is a woofer.

6. Audio or video apparatus as claimed in claim 1, wherein the acoustic channel has fixed dimensions in the shape of an acoustic horn.

7. An audio apparatus comprising:
a housing having a sound aperture in one wall thereof,
an acoustic channel within the housing having a flared end which opens into said sound aperture,
a loudspeaker mounted within said housing and having a diaphragm in one wall of the acoustic channel so that the loudspeaker acoustically cooperates with said channel, said diaphragm having at least one dimension substantially larger than at least one dimension of said aperture and supported at an angle to said one wall of the housing, wherein a dimension of the diaphragm in the longitudinal direction of the acoustic channel is at least half of the length of the acoustic channel and the loudspeaker is arranged in the channel and the channel includes a sound reflecting surface shaped in a manner such that, for a part of said diaphragm which is at least half of the diaphragm surface area, lines perpendicular to said part of the diaphragm surface form equal angles of incidence and reflection to the channel surface and after a first reflection by the channel surface said lines are not directed at the aperture.

8. An audio apparatus as claimed in claim 7 wherein the diaphragm surface comprises at least a quarter of the surface of the acoustic channel.

9. An audio apparatus as claimed in claim 7 wherein the outer periphery of the diaphragm lies in a plane which forms an acute angle with respect to said one wall of the housing.

10. An audio apparatus as claimed in claim 7 wherein said housing further comprises a cavity behind said loudspeaker diaphragm and with said acoustic channel and said cavity acoustically separated from one another.

11. An audio apparatus comprising:
a housing having a sound aperture in one wall thereof,
an acoustic channel within the housing having a flared end which opens into said sound aperture,
a loud-speaker mounted within said housing and having a diaphragm in one wall of the acoustic channel so that the loud-speaker acoustically cooperates with said channel, said diaphragm having at least one dimension substantially larger than at least one dimension of said aperture and supported at an angle to said one wall of the housing, wherein a dimension of the diaphragm in the longitudinal direction of the acoustic channel is at least half of the length of the acoustic channel and the loud-speaker is arranged in the channel and the channel is shaped in a manner such that for a part of said diaphragm which is at least half of the diaphragm surface area, lines perpendicular to said part of the diaphragm surface form equal angles of incidence and reflection to the channel surface and after a first reflection by the channel surface said lines are not directed at the aperture, and
wherein the surface of the diaphragm is in a non-flared wall of the acoustic channel and the outer periphery of the diaphragm lies in a plane at an angle of approximately 90 degrees with respect to said one wall of the housing.

12. A car radio audio apparatus comprising: a housing, a loud-speaker which reproduces a low-frequency audio signal and is incorporated in the housing, wherein the housing accommodates an acoustic channel having one end opening into an aperture in a side of the housing, wherein the loud-speaker acoustically cooperates with the channel and a diaphragm of the loud-speaker forms a part of a wall of the acoustic channel, and the acoustic channel has a perpendicular cross-section which continuously increases viewed in the direction of the aperture in said side, characterized in that the length of the loud-speaker viewed in the longitudinal direction of the acoustic channel is greater than or equal to half the length of the acoustic channel, and in that the loud-speaker is arranged in the channel and the channel is shaped in a manner such that for a part of the loud-speaker diaphragm, the size of said part being greater than or equal to half the surface of the diaphragm, lines perpendicular to said part of the diaphragm surface, once they have been reflected by the channel surface one time, are not directed at said aperture, said lines forming equal angles of incidence and reflection to the channel surface, and second and third loud-speakers reproducing a higher frequency portion of a respective left or right signal portion of a stereo signal, and wherein the second and third loud-speakers are mechanically coupled to said side of the housing.

13. A car radio as claimed in claim 12, wherein each of the second and third loud-speakers are coupled to said side of the housing by means of a support.

14. A car radio as claimed in claim 13, wherein the second and third loud-speakers are adjustable with respect to the housing.

15. A car radio as claimed in claim 13, wherein the supports are adjustable with respect to the housing.

* * * * *